Figure 1:
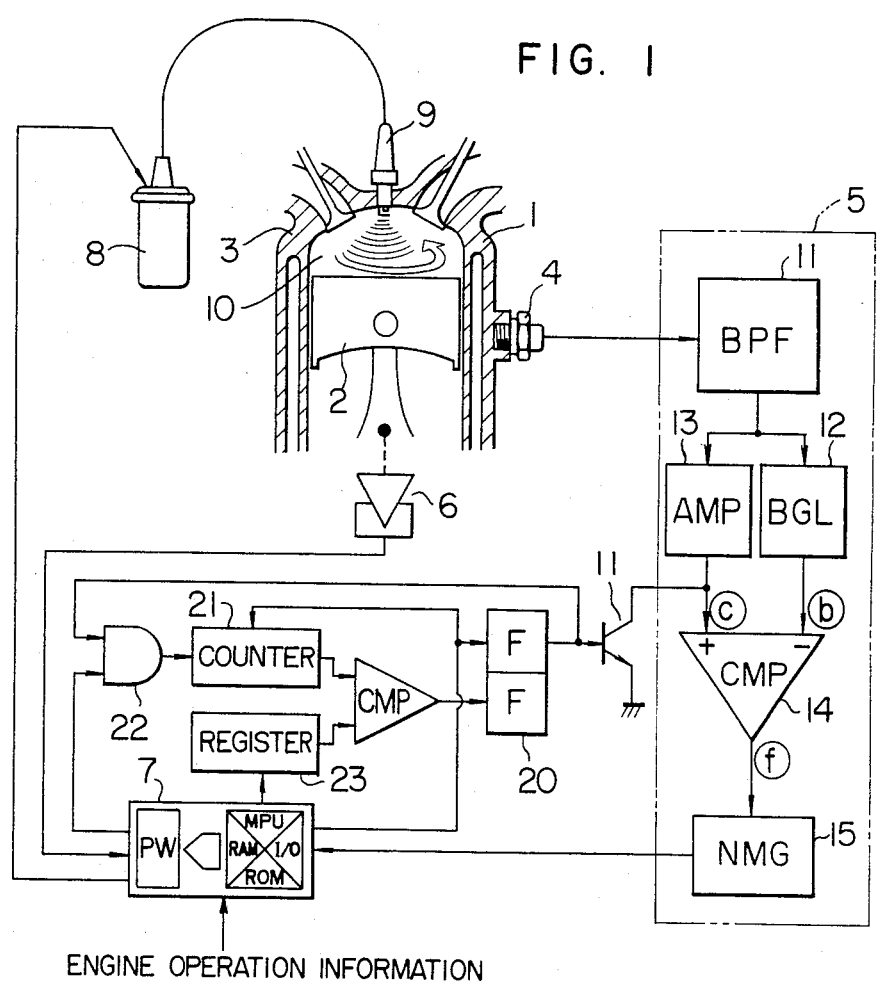

United States Patent [19]

Abe et al.

[11] Patent Number: 4,549,514

[45] Date of Patent: Oct. 29, 1985

[54] METHOD AND APPARATUS FOR CONTROLLING KNOCKING OF AN INTERNAL COMBUSTION ENGINE

[75] Inventors: Osamu Abe; Yasunori Mouri; Noboru Sugiura, all of Katsuta, Japan

[73] Assignee: Hitachi, Ltd., Tokyo, Japan

[21] Appl. No.: 469,404

[22] Filed: Feb. 24, 1983

[30] Foreign Application Priority Data

Feb. 24, 1982 [JP] Japan .................................. 57-27325

[51] Int. Cl.[4] .................................................. F02P 5/04
[52] U.S. Cl. ..................................... 123/425; 123/435
[58] Field of Search ................................. 123/425, 435

[56] References Cited

U.S. PATENT DOCUMENTS

| | | | |
|---|---|---|---|
| 4,002,155 | 1/1977 | Harned | 123/425 |
| 4,153,020 | 5/1979 | King | 123/425 |
| 4,211,194 | 7/1980 | Hahori | 123/425 |
| 4,245,602 | 1/1981 | Omori | 123/425 |
| 4,261,313 | 4/1981 | Iwata | 123/425 |
| 4,274,379 | 6/1981 | Iwata | 123/425 |

Primary Examiner—Ronald B. Cox
Attorney, Agent, or Firm—Antonelli, Terry & Wands

[57] ABSTRACT

Disclosed are method and apparatus for controlling knocking of an internal combustion engine by retarding an ignition timing in accordance with a knocking intensity of detected knocking and advancing the ignition timing at a predetermined velocity after the ignition timing has been retarded. When the detected knocking intensity is below a predetermined level, it is regarded that the knocking has not occurred and the retardation is inhibited.

12 Claims, 19 Drawing Figures

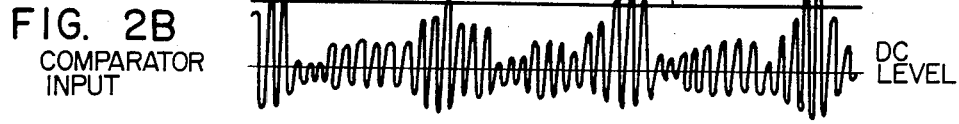
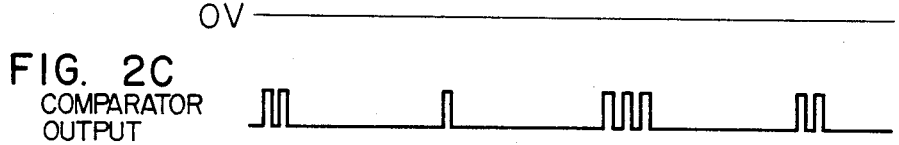
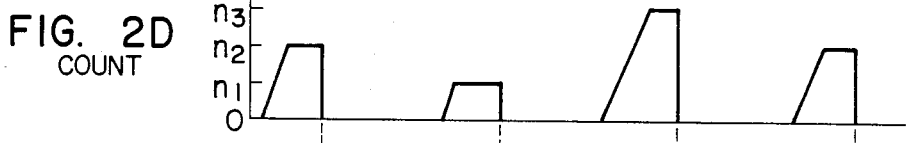
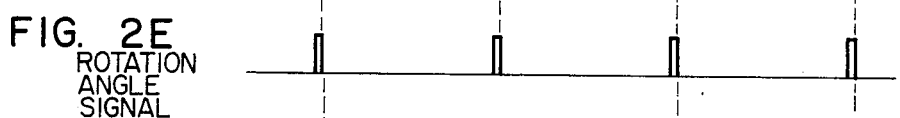
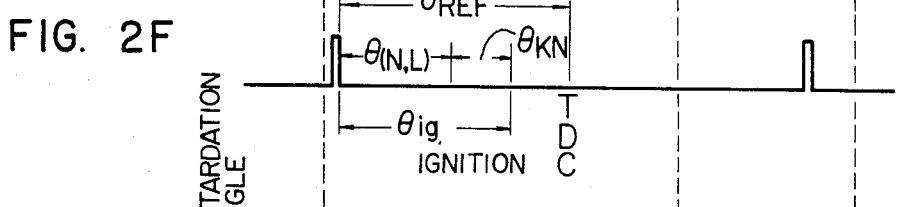
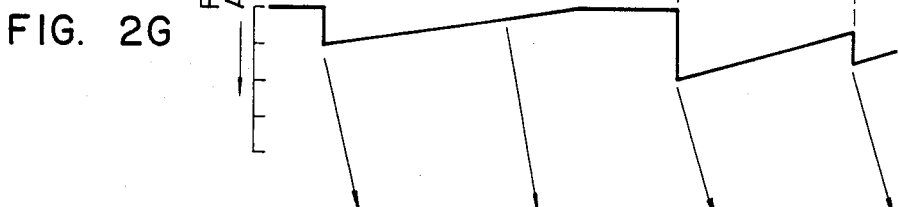

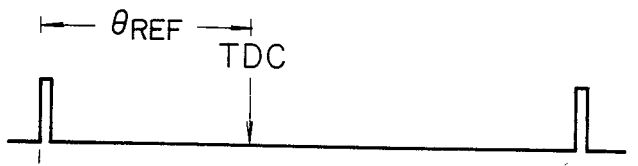
FIG. 4A
ROTATION ANGLE SIGNAL
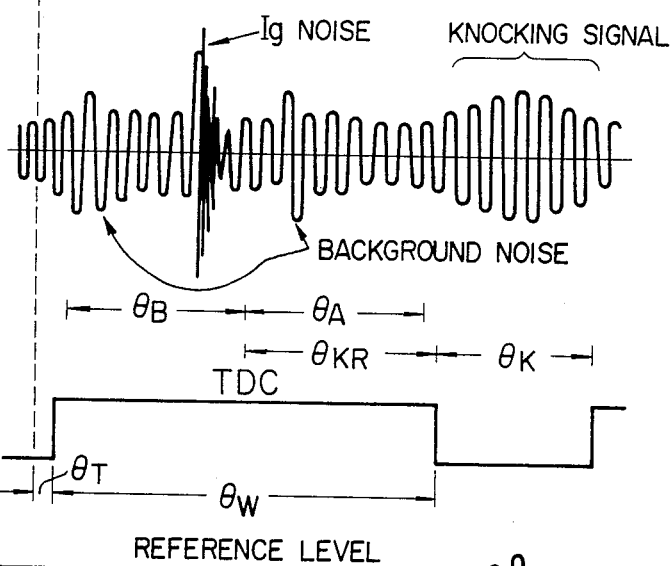
FIG. 4B
KNOCKING SENSOR SIGNAL
FIG. 4C
MASKING SIGNAL
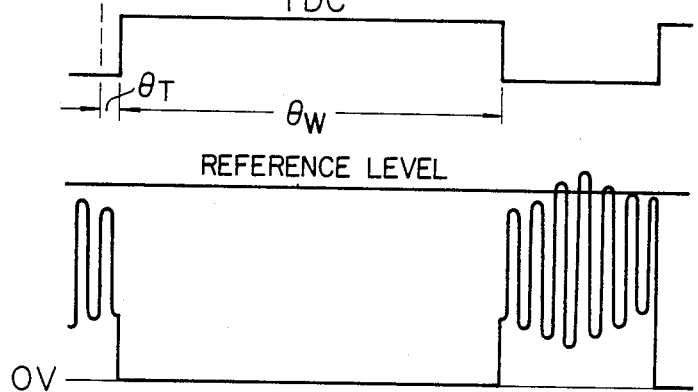
FIG. 4D
SIG
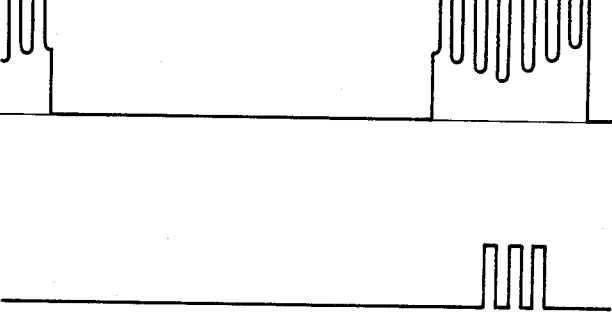
FIG. 4E
CMP

METHOD AND APPARATUS FOR CONTROLLING KNOCKING OF AN INTERNAL COMBUSTION ENGINE

The present invention relates to method and apparatus for controlling knocking of an internal combustion engine, and more particularly to knocking control in which knocking pulse signals generated during a knocking condition are counted to retard ignition timing in accordance with the detected count.

Lean gas mixture combustion has been recently practiced in order to improve fuel economy. However, when the lean gas mixture combustion is effected in a prior art engine, the engine output is lowered. In order to increase the engine output, the compression efficiency of the engine is increased to increase the output per unit of air-fuel ratio. However, as the engine compression ratio is increased, knocking is likely to occur. The knocking of the engine degrades the drivability because of the knocking noise and leads to a reduction of the engine output due to generation of an inverse torque or the engine may be damaged due to engine overheating. It has been known that the knocking is closely related to the ignition timing and a maximum engine output is obtained by setting the ignition timing or the ignition leading angle to a point immediately before the point when knocking occurs, as a nature of the engine. Accordingly, the reduction of the ignition leading angle in order to avoid the knocking leads to the reduction of the engine output and hence it is required to set the ignition timing to a point immediately before the point when the knocking occurs. Particularly in an engine with a turbo charger which has a high compression ratio, it is required to optimize the ignition timing in order to maintain maximum efficiency. In the past, accordingly, control is effected to retard the ignition timing to stop the knocking if it occurs, as shown, for example, in U.S. Pat. No. 4,002,155, U.S. Pat. No. 4,153,020 and Japanese Patent Application Kokai (Laid-Open) No. 87308/79.

In such a prior art knocking control apparatus, an output signal from a knocking sensor is compared with a background level signal to discriminate the knocking signal if the former exceeds the background level, and the ignition timing is retarded in accordance with the knocking signal. However, since the knocking sensor senses all vibrations of the engine, the knocking may be detected when the knocking is actually not present and the ignition timing may be improperly retarded. As a result, the prior art knocking control apparatus cannot maintain the engine ignition timing at the optimum position.

It is an object of the present invention to control a knocking control apparatus which controls the engine ignition timing to a position immediately before the knocking point.

In accordance with the present invention, it has been experimentarily confirmed that the knocking sensor produces a single-shot knocking signal in response to an external disturbance in spite of the fact that the knocking is actually not present, and in order to prevent the retardation of the ignition timing by such a single-shot irregular knocking signal, the knocking pulse signals are counted for each rotation angle signal interval, and if the count, does not reach a predetermined count it is determined that the knocking has not occurred and the retardation of the ignition timing is suppressed to maintain the engine ignition timing at the optimum point.

Figure 3:
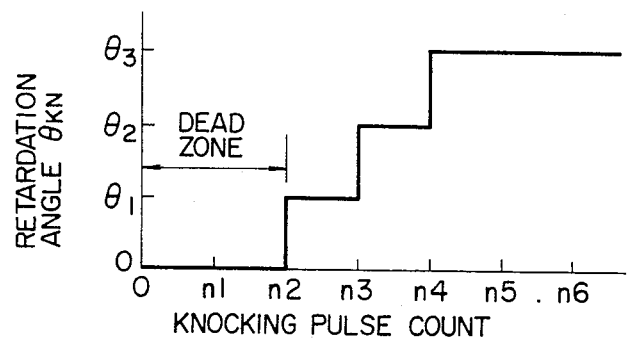
Figure 5:
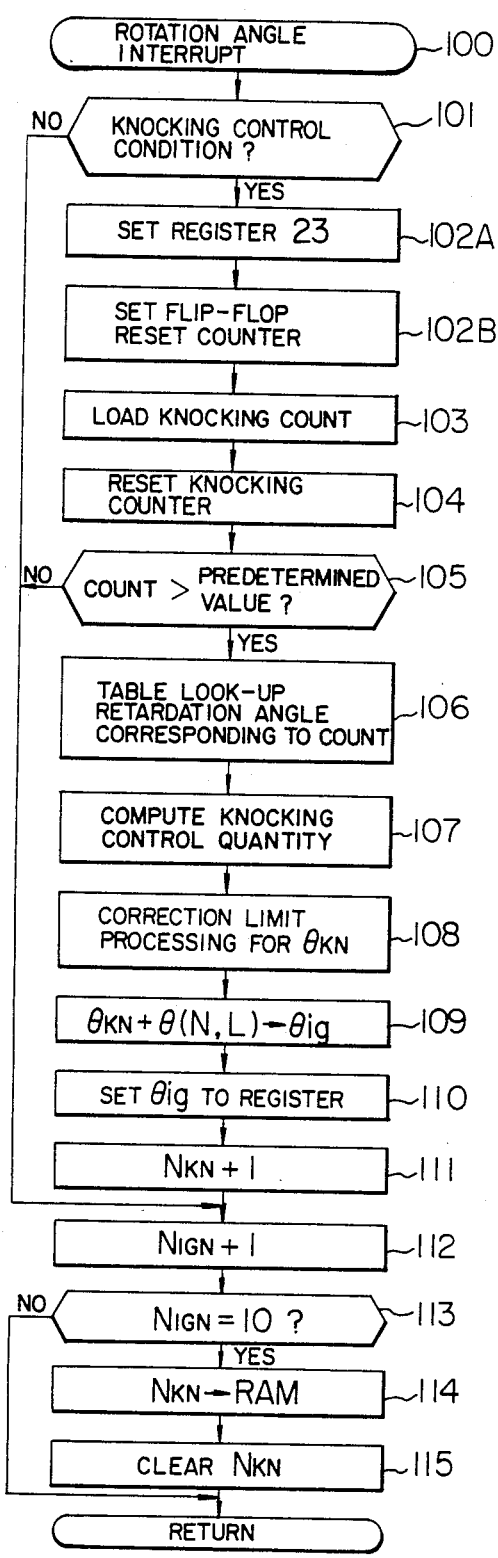
Figure 7:
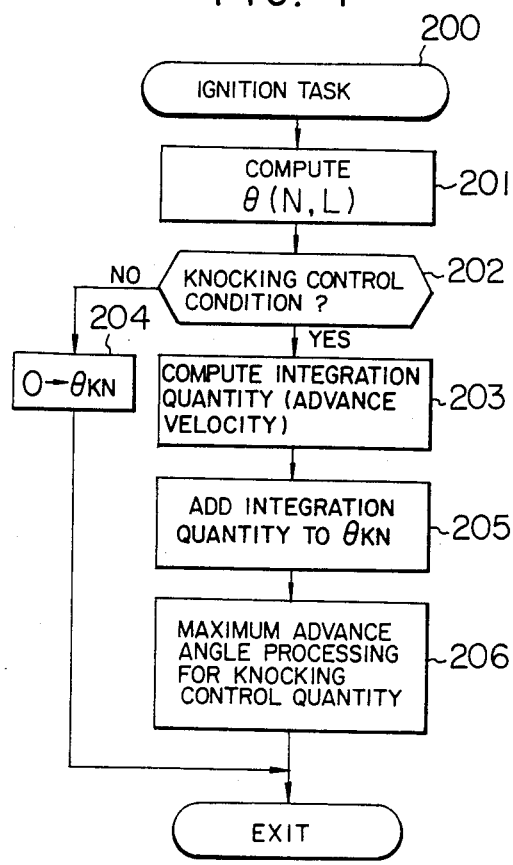
Figure 6:
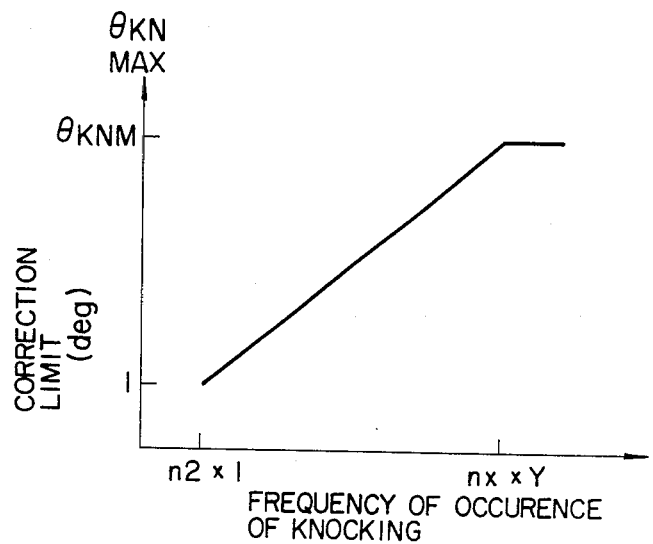
Figure 8:
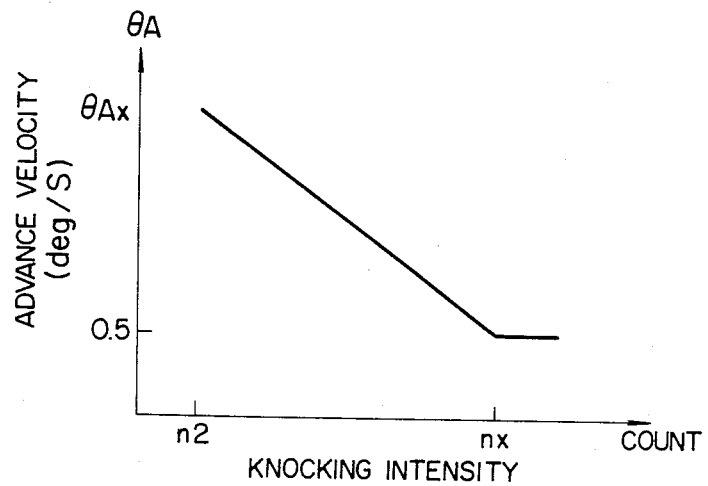

The above and other objects, features and advantages of the present invention will be apparent from the following detailed description taken in conjunction with the accompanying drawings, in which:

FIG. 1 shows a system diagram of an electronic engine control apparatus in accordance with one embodiment of the present invention, FIGS. 2(A-H) shows waveforms of the system shown in FIG. 1, FIG. 3 shows a knocking control proportional quantity characteristic, FIGS. 4(A-E) shows waveforms of the system shown in FIG. 1, FIG. 5 shows a control flow chart of the present invention, FIG. 6 shows a correction limit characteristic, FIG. 7 shows another control flow chart in accordance with the present invention, and FIG. 8 shows a knocking control integration quantity characteristic.

FIG. 1 shows one embodiment of the present invention. Numeral 1 denotes an engine having a combustion chamber 10 comprising a piston 2 and a cylinder block 3. An ignition plug 9 is arranged in the combustion chamber 10 and a knocking sensor 4 is mounted on the engine 1. The knocking sensor 4 is electrically connected to a knocking detector 5 which comprises a band-pass filter 11, a background level output circuit 12, a signal amplifier 13, a comparator 14 and a noise masking gate 15. An output from the knocking detector 5 is supplied to an electronic engine control unit which comprises an MPU, a ROM, a RAM, an I/O and a driver PW. Numeral 6 denotes a rotation angle sensor which senses the rotation angle or the velocity of the engine. An output from the sensor 6 is supplied to the electronic engine control unit 7 as input information. The electronic engine control unit 7 also receives engine operation information such as engine temperature and a starter signal. An ignition output signal from the electronic engine control unit 7 is supplied to the ignition plug 9 through an ignition coil 8 so that ignition energy is supplied to the engine. While only an ignition system is illustrated in the present embodiment, it should be understood that the fuel system is also controlled by a signal from the electronic engine control unit 7.

If abnormal combustion occurs in the engine combustion chamber 10 shown in FIG. 1, a pressure change causes generation of an oscillation wave and it is conveyed to the knocking sensor 4. This oscillation wave is sensed by the knocking sensor 4, which produces a signal as shown in FIG. 2A. Since the signal of FIG. 2A includes many noises, a frequency band inherent to the knocking is discriminated by the band-pass filter 11 of the knocking detector 5. The frequency band is usually 6-7.5 KHz although it may slightly vary depending on the type of car. The output from the band-pass filter 11 is averaged by the background level output circuit 12, an output of which is supplied to the comparator 14 as a reference level to detect the knocking. The output of the band-pass filter 11 is also amplified by the signal amplifier 13, the output of which is supplied to the comparator 14. The comparator 14 compares the knocking signal with the reference level as shown in FIG. 2B and produces output signals only for those knocking signal portions which exceed the reference level as shown in FIG. 2C. Those output signals are supplied to the noise masking gate 15. When the detected signal exceeds a noise making level which is set at a relatively high level, the noise masking gate 15 determines that the detected signal is not the knocking signal but a shock noise due to unevenness of the road. In this manner, an excessively large signal is eliminated from the knocking signal.

The knocking pulses shown in FIG. 2C are counted in the electronic engine control unit 7 as shown in FIG. 2D. The unit 7 has a function to reset the counter immediately after the knocking pulse count has been stored in the RAM by an interrupt signal which is a rotation angle signal, shown in FIG. 2E, supplied from the rotation angle sensor 6.

When the knocking intensity or the retardation angle $\theta_{KN}$ which is dependent on the knocking pulse count is to be determined for a basic ignition position $\theta(N,L)$ calculated on the basis of the operation information of the internal combustion engine, the issuance of a retardation command is suppressed when the knocking pulse count is smaller than $n_2$ so that a dead zone which neglects the knocking is established as shown in FIG. 3. The value of $n_2$ may be selected to any desired value. In the present invention, $n_2$ is usually set to "1" or larger in order to eliminate a one-shot noise so that the knocking is detected only when the count is larger than $n_2$.

As shown in FIG. 2F, the rotation angle signal is fixed at a point which is $\theta_{REF}$ in advance of a top dead center TDC, and the basic ignition point is retarded from the rotation angle position by the angle $\theta(N,L)$. The retardation angle $\theta_{KN}$ is added to the basic ignition position $\theta(N,L)$. As a result, the ignition position is displaced from the rotation angle position by $\theta_{ig}$. After the ignition position has been retarded, the ignition timing is advanced by one step for every 40 msec at a predetermined rate, for example, 1 deg/sec, as shown in FIG. 2G. Accordingly, the advancement angle in one step is 1/25 degree.

The signal outputted from the knocking sensor 4 shown in FIG. 1 includes many external disturbances or noises. The noises include an ignition noise by ignition arc of the engine and a background vibration noise inherent in the engine operation, generated by the piston and connecting rod, as shown in FIG. 4B. The latter noise is also generated in a compression excursion immediately before explosion. Relative positional relationship of those noises, the knocking point and the engine top dead center (TDC) is shown in FIG. 4C. The ignition noise and the background vibration noise are in a range of minus $\theta_b$ and plus $\theta_A$ relative to TDC as shown in FIG. 4B, and the knocking position is in a range of $\theta_K$ following plus $\theta_{KR}$ period, as is well known in the art. This positional relationship is substantially constant for the rotational speed of the engine.

As shown in FIG. 1, a masking transistor 11 is connected to the junction of the signal amplifier 13 and the comparator 14 of the knocking detector 5, and a rotation angle signal generated at a phase angle of $\theta_{REF}$ before TDC as shown in FIG. 4A is applied to the transistor 11 as a trigger signal to produce a masking signal for a period $\theta_W$ following a $\theta_T$ period as shown in FIG. 4C so that the knocking signal is masked during that period as shown in FIG. 4D.

Accordingly, the harmful external disturbance noises are blocked for the period of $\theta_W$ as shown in FIG. 4D and the comparator 14 produces an output only during the knocking period as shown in FIG. 4E. In addition, the ignition point is not retarded for the one-shot irregular knocking, as described above.

In FIG. 1, the drive circuit PW of the electronic engine control unit 7 produces a control pulse when the ignition position has been rotated by an angle $\theta_T$ from the rise of the rotation angle signal as shown in FIG. 4C. This control pulse causes the flip-flop 20 to be set to turn on the transistor 11 and set the output of the amplifier 13 to a low level so that the knocking signal is masked and the counter 21 is reset. As the flip-flop 20 is set, the AND gate 22 is conditioned and pulses which are generated at a rate of 360 pulses per revolution of the crank and sensed by the sensor 6 through the engine control unit 7 are gated through the AND gate 22. Those pulses are counted by the counter 21. An angular signal corresponding to $\theta_W$ of FIG. 4C is supplied to the register 23 from the engine control unit 7. When the count of the counter 21 coincides with the content of the register 23, the comparator 24 produces a coincidence pulse which causes the flip-flop 20 to be reset. As a result, the masking of the knocking signal is released and the AND gate 22 is closed so that the counter 21 stops its counting operation. When the engine control unit 7 produces the next control pulse, the same operation as described above is repeated.

The above control operation is now explained with reference to a flow chart of FIG. 5. When a rotation angle interrupt occurs in a step 100, a knocking control condition is checked in a step 101. Since the engine control unit 7 properly controls the ignition timing during a starter operation or when the coolant temperature is below 60° C., the knocking control which results in the retardation is not advisable. In this case, it is determined that the knocking control condition is not met. When the decision of no knocking condition is made, the process jumps to a step 112, and when the decision of the knocking condition is made, the process shifts to a step 102A. In the step 102A, a value corresponding to $\theta_W$ is stored in the register 23, and in a step 102B a control pulse is generated if the rotation of angle $\theta_T$ is detected by the rotation angle signal. As a result, the flip-flop 20 is set to mask the knocking signal and reset the counter 21 as described above.

In a step 103, the knocking count of the knocking counter 21 of the engine control unit 7 which counts the knocking signals is loaded into the RAM. In a step 104, the knocking counter 21 is reset. After the knocking counter 21 has been reset in the step 104, the count is compared with a predetermined value, that is, $n_2$ in FIG. 3 in a step 105. If the comparison in the step 105 shows that the count is not larger than the predetermined value $n_2$, the process jumps to the step 112, and if the count is larger than the predetermined value $n_2$, the process shifts to a step 106 where a proportional retardation angle corresponding to the count is looked up by a table which contains the relation as shown in FIG. 3. In a step 107, the looked-up retardation angle is added to the current retardation angle to calculate a knocking control quantity $\theta_{KN}$, and in a step 108, a correction limit for the knocking control quantity $\theta_{KN}$ is determined. Since the ignition timing is retarded incrementarily by the retardation angle corresponding to the count each time when the knocking is detected, the retardation is limited by the correction limit processing so that an unnecessarily large retardation due to misdetection of the noise as the knocking signal is prevented. The correction limit is determined in accordance with a map which is predetermined in accordance with the operation condition of the engine. After the correction limit processing in the step 108, the knocking control quantity $\theta_{KN}$ is added to the ignition timing $\theta(N,L)$ calculated on the basis of the operation condition to produce an ignition timing $\theta_{ig}$ in a step 109. In a step 110, the ignition timing $\theta_{ig}$ is set in the register. In a step 111, the count $N_{KN}$ of the knocking counter 21 is incremented by one. Thus, the knocking counter 21 represents the number of times of occurrence of knocking. In the step 112, the count $N_{IGN}$ of the ignition counter is incremented by one. The ignition counter is incremented by one each time the rotation angle interrupt occurs. In a step 113, it is checked to see if the count $N_{IGN}$ has reached to 10. If the decision is NO, the process is returned, and if the decision is YES, the process is shifted to a step 114 where the count $N_{KN}$ of the knocking register is stored in the RAM, and in a step 115, the knocking register is cleared and the process is returned. Accordingly, the count $N_{KN}$ stored in the RAM represents the frequency of the occurrence of knocking. When the frequency of the occurrence of knocking is high, it represents a shortage of the retardation limit. Thus, as shown in FIG. 6, the higher the frequency of the occurrence of knocking is, the larger is the correction limit in the step 108. When the frequency of the occurrence of knocking inceases beyond a predetermined value, the increment of the correction limit is fixed as shown in FIG. 6. The function of FIG. 6 is stored in the ROM in a map form. Immediately after the ignition, an ignition task is executed. In a step 200, the ignition task is executed, and in a step 201, the ignition timing $\theta(N,L)$ is computed by map look-up based on operation parameters in a well-known manner, and in a step 202 the knocking control condition is checked in the same manner as the step 101. If the knocking control condition is met in the step 202, it means that the ignition timing is retarded, and an integration quantity (advance velocity) is computed in a step 203. If the knocking control condition is not met in the step 202, it means that the ignition timing is not retarded, and an ignition timing increment $\theta_{KN}$ corresponding to the knocking control quantity is set to zero in a step 204 and the process exits. In the step 203, the knocking intensity loaded in the step 103 is read out and the advance velocity is read out from a map stored in the ROM which contains the relation shown in FIG. 8. As shown in FIG. 8, the larger the knocking intensity is, the smaller is the advance velocity, and hence the lower is the frequency of the occurrence of knocking. The advance velocity represents an angle or an integration quantity to be advanced in a step 205. In the step 205, the integration quantity is subtracted from $\theta_{ig}$ computed in the step 109. In a step 206, maximum advance angle processing is effected so that the knocking control quantity does not exceed a maximum advance angle limit which is looked up from the map based on the operation parameters. Then, the process exits.

In accordance with the present embodiment, the control is not influenced by the external disturbance such as noises and the performance is stable.

As described hereinabove, according to the present invention, the engine ignition timing can be maintained at an optimum point.

Further, even if the knocking intensity changes by the aging of the engine, a wide control range is assured and a variance can be absorbed.

We claim:

1. A method for controlling knocking of an internal combustion engine comprising the steps of:
    detecting an operation condition of said engine to determine a reference ignition point;
    generating a number of electrical signal pulses corresponding to a knocking intensity in response to knocking during an ignition cycle;
    counting said number of said pulses during said ignition cycle;
    determining for an ignition cycle a retardation angle $\theta_{KN}$ relative to said reference ignition point based on the count obtained during said ignition cycle; and
    gradually advancing an ignition point determined by said reference ignition point and said retardation angle;
    said step of determining said retardation angle including the step of inhibiting retardation of the ignition point when said count for said ignition cycle is below a predetermined value, so as to create a dead zone in the control of said ignition point wherein said count is below said predetermined value.

2. A method for controlling knocking of an internal combustion engine according to claim 1 wherein said step of determining said retardation angle is based on the count counted during each ignition cycle of said internal combustion engine.

3. A method for controlling knocking of an internal combustion engine according to claim 2 wherein said step of counting said pulses is inhibited in at least a predetermined range before and after the top dead center during each of the ignition cycles of said internal combustion engine to eliminate background noises.

4. A method for controlling knocking of an internal combustion engine according to claim 1 wherein said step of determining said retardation angle includes looking up said retardation angle from a predetermined table based on said count.

5. A method for controlling knocking of an internal combustion engine according to claim 1 wherein said step of advancing said ignition point determines an advance velocity in accordance with said count.

6. A method for controlling knocking of an internal combusion engine comprising the steps of:
    detecting an operation condition of said engine to determine a reference ignition point;
    generating a number of pulses corresponding to a knocking intensity in response to knocking;
    counting said pulses,
    determining a retardation angle $\theta_{KN}$ relative to said reference ignition point based on the count; and
    gradually advancing an ignition point determined by said reference ignition point and said retardation angle including determining an advance velocity in accordance with said count;
    said step for determining said retardation angle including the step of inhibiting further retardation when said count is below a predetermined value wherein the larger said count is, the smaller is said advance velocity.

7. A method for controlling knocking of an internal combustion engine comprising the steps of:
    detecting an operation condition of said engine to determine a reference ignition point;
    generating a number of pulses corresponding to a knocking intensity in response to knocking;
    counting said pulses;

determining a retardation angle $\theta_{KN}$ relative to said reference ignition point based on the count; and gradually advancing an ignition point determined by said reference ignition point and said retardation angle;

said step for determining said retardation angle including the step of inhibiting further retardation when said count is below a predetermined value; and wherein said step of determining said retardation angle includes the step of adding the retardation angle as determined on the basis of said count to the current ignition point.

8. A method for controlling knocking of an internal combustion engine according to claim 7 further comprising a step for limiting said retardation angle such that a retardation angle from said reference ignition point does not exceed a predetermined retardation limit.

9. A method for controlling knocking of an internal combustion engine according to claim 8 further comprising a step for detecting the frequency of occurrence of the knocking and a step for changing said retardation limit in accordance with said frequency of occurrence of the knocking.

10. A method for controlling knocking of an internal combustion engine according to claim 9 wherein said step of detecting said frequency of occurrence of the knocking detects the knocking only when said count is larger than said predetermined value.

11. A method for controlling knocking of an internal combustion engine according to claim 9 wherein the higher said frequency of occurrence of the knocking is, the larger is said retardation limit.

12. An apparatus for controlling knocking of an internal combustion engine comprising:

means for detecting an operation condition of said engine to determine a reference ignition point;

means responsive to knocking for generating a number of electrical signal pulses corresponding to a knocking intensity during an ignition cycle;

means for counting said number of said pulses during said ignition cycle;

means for determining for an ignition cycle a retardation angle $\theta_{KN}$ relative to said reference ignition point based on said count obtained during said ignition cycle; and means for gradually advancing an ignition position determined by said reference ignition point and said retardation angle;

said means for determining said retardation angle including means for inhibiting said retardation angle including means for inhibiting the retardation of the ignition position when said count for said ignition cycle is below a predetermined value, so as to create a dead zone in the control of said ignition position wherein said count is below said predetermined value.

* * * * *